United States Patent [19]
Broadway et al.

[11] 3,898,543
[45] Aug. 5, 1975

[54] ELECTRIC MOTORS

[75] Inventors: Alexander Richard William Broadway; William Fong; Gordon Hindle Rawcliffe, all of Bristol, England

[73] Assignee: National Research Development Corporation, London, England

[22] Filed: Jan. 31, 1974

[21] Appl. No.: 438,270

[30] Foreign Application Priority Data
Apr. 13, 1973 United Kingdom............... 17942/73

[52] U.S. Cl............................................ 318/224 R
[51] Int. Cl. ............................................. H02p 7/42
[58] Field of Search ..................... 318/224 R, 225 R

[56] References Cited
UNITED STATES PATENTS
3,299,337  1/1967  Rawcliffe et al................ 318/224 R
3,673,477  6/1972  Broadway et al.............. 318/224 R Primary Examiner—G. Z. Rubinson
Attorney, Agent, or Firm—Larson, Taylor & Hinds

[57] ABSTRACT

A 3-phase, alternating current, speed-changing electric motor, or generator, suitable for 6-terminal, series/parallel switching and with pole-changing effected by pole-amplitude modulation, having a composite 3-phase stator winding comprising two component windings; the two component windings
i. having corresponding component phase-windings connected in the same phase of the composite winding,
ii. being composed of identical halves of a pole-amplitude modulation winding providing the required operating pole-numbers and
iii. providing equal, parallel circuits for one pole-number.

5 Claims, 2 Drawing Figures

```
1  2  3  4  5  6  7  8  9  10 11 12 13 14 15 16 17 18 19 20 21 22 23 24      - SLOT NUMBERS

A -C -C B -A  C  C -B -B  A  A -C  B -A -A  C  C -B -B  A -C  B  B -A        - FIRST HALF OF WINDING
                                                                                 ⌐⌐ REVERSE FOR 14 POLES 25 26 27 28 29 30 31 32 33 34 35 36 37 38 39 40 41 42 43 44 45 46 47 48      - SLOT NUMBERS

-A  C  C -B  A -C -C  B  B -A -A  C -B  A  A -C -C  B  B -A  C -B -B  A      - SECOND HALF OF WINDING

|——— 10 SLOTS ———→|25' 26' 27' 28' 29' 30' 31' 32' 33' 34' 35' 36' 37' 38' 39' 40' 41' 42' 43' 44' 45' 46' 47' 48'  -SLOT NUMBERS

-A  C  C -B -B  A -C  B  B -A -A  C  C -B  A -C -C  B  B -A -A  C -B  A  A -C -C  B  B -A  C -B -B  A    - SECOND HALF OF
                                                                                                           WINDING SHIFTED
                                                                                                           10 SLOTS.
```

'OVERLAPPING' COILS MOVED π MECHANICAL RADIANS

FIG. 1

1 2 3 4 5 6 7 8 9 10 11 12 13 14 15 16 17 18 19 20 21 22 23 24 — SLOT NUMBERS

A $\overline{\text{-C}}$ C $\overline{\text{-C}}$ B $\overline{\text{-A}}$ C $\overline{\text{-C}}$ B $\overline{\text{-B}}$ A $\overline{\text{-A}}$ C $\overline{\text{-B}}$ $\overline{\text{-A}}$ C $\overline{\text{-C}}$ B $\overline{\text{-B}}$ A $\overline{\text{-C}}$ $\overline{\text{B}}$ $\overline{\text{B}}$ -A — FIRST HALF OF WINDING
⟶ REVERSE FOR 14 POLES 25 26 27 28 29 30 31 32 33 34 35 36 37 38 39 40 41 42 43 44 45 46 47 48 — SLOT NUMBERS -A $\overline{\text{C}}$ C $\overline{\text{-C}}$ B B $\overline{\text{-A}}$ $\overline{\text{-A}}$ C $\overline{\text{-B}}$ A $\overline{\text{-A}}$ C $\overline{\text{-C}}$ B $\overline{\text{-B}}$ A $\overline{\text{-C}}$ $\overline{\text{B}}$ B $\overline{\text{-A}}$ C $\overline{\text{-B}}$ $\overline{\text{-B}}$ A — SECOND HALF OF WINDING $\longleftarrow$ 10 SLOTS $\longrightarrow$ 25' 26' 27' 28' 29' 30' 31' 32' 33' 34' 35' 36' 37' 38' 39' 40' 41' 42' 43' 44' 45' 46' 47' 48' — SLOT NUMBERS -A $\overline{\text{C}}$ C $\overline{\text{-C}}$ B $\overline{\text{-A}}$ C $\overline{\text{-C}}$ B $\overline{\text{-B}}$ A $\overline{\text{-A}}$ C $\overline{\text{-B}}$ $\overline{\text{-A}}$ C $\overline{\text{-C}}$ B $\overline{\text{-B}}$ A $\overline{\text{-C}}$ $\overline{\text{B}}$ $\overline{\text{B}}$ -A — SECOND HALF OF WINDING SHIFTED 10 SLOTS.

"OVERLAPPING" COILS MOVED π MECHANICAL RADIANS

FIG. 2
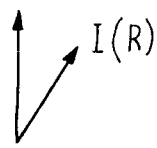
(a) E.M.F'S INDUCED IN FIRST HALF-WINDING
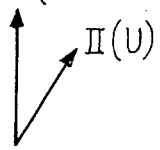
(b) E.M.F'S INDUCED IN SECOND HALF-WINDING
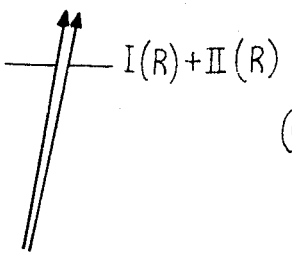
(c) E.M.F'S INDUCED IN RESULTANT WINDING.

ELECTRIC MOTORS

This invention relates to three-phase, alternating current, speed-changing electric motors and generators, in which speed-changing is effected by the method of pole-amplitude modulation, (PAM).

The method of speed-changing by pole-amplitude modulation has been described in papers by Professor G. H. Rawcliffe and others, the first entitled "Induction Motor Speed-Changing by Pole-Amplitude Modulation" in the Proceedings of The Institution of Electrical Engineers, Vol. 105, Part A, No. 22, August 1958 and a second entitled "Speed-Changing Induction Motors — Further Developments in Pole-Amplitude Modulation" in the Proceedings of The Institution of Electrical Engineers, Vol. 107, Part A, No. 36, December 1960.

The method has been further described and defined in U.S. Pat. Nos. 3,233,159, 3,175,142, 3,197,686, 3,299,337, 3,673,477 and others.

The object of the present invention is to provide further improved electric machines in which speed-changing is effected by pole-amplitude modulation.

It is known, for example from British Patent Specification No. 1,133,062, to provide a three-phase machine having a stator winding comprising three similar winding components, each component itself comprising three phase-windings and each component by itself being suitable for use as the stator winding of a three-phase machine, even though the component winding might not be satisfactory in respect of the resultant magnetomotive force waveform. In that specification the composite stator windings described were assembled by arranging a particular phase-winding of the component winding to be in phase A for the first component, phase B for the second component and phase C for the third component. The resultant composite winding was thus exactly balanced with respect to all three phase-windings.

U.S. patent application Ser. No. 272,669 describes an invention distinguished by a composite three-phase stator winding comprising two component windings having their corresponding phase-windings arranged in the same phase of the resultant composite winding but spaced apart from each other around the winding.

Thus, U.S. patent application Ser. No. 272,669 describes a three-phase, alternating-current, speed-changing electric machine, comprising a motor or generator, in which pole-changing is effected by the method of pole-amplitude modulation, having a composite three-phase stator winding comprising two similar component windings each with three phase-windings and having the corresponding phase-windings of the component windings connected together as a phase-winding of the composite winding and having corresponding phase-windings of the two component windings spaced apart from each other around the stator winding periphery, in which pole-changing is effected by an even-cycle, overall modulation wave, each of the two said component windings comprising a substantially balanced three-phase winding and, in each of the three phase-windings of the composite stator winding, an equal number of coils are reversed in current-carrying sense as the number of coils remaining unchanged, for speed-changing of the machine, and in which each of the two said component windings is made up from three unbalanced winding elements, the three said elements being arranged with corresponding coil groups in the three phases, respectively, of the component winding.

The present invention is distinguished by a composite three-phase stator winding comprising two component windings having their corresponding phase-windings arranged in the same phase of the resultant composite winding, each component winding comprising identical halves of a PAM winding providing the required operating pole-numbers by even-cycle modulation, the two said half windings being spaced apart from each other around the winding and providing equal parallel circuits for one pole-number, usually the smaller pole-number, where previously these circuits were unequal or unavailable.

In order that the invention may readily be carried into practice, one embodiment will now be described in detail, by way of example, with reference to the accompanying drawings, of which:

FIG. 1 is a layout diagram of a 10-pole/14-pole PAM winding, wound in a 48-slot stator and FIG. 2 shows vector diagrams of e.m.f's induced in each phase by ideal side-by-side parallel circuits.

Referring to FIG. 1, there is shown, at the top of the figure below the slot numbers 1 to 24, the first half of a 10-pole/14-pole PAM winding in 48 slots. Below, under the slot numbers 25 to 48, is shown the second half of this PAM winding and it will be noted that the two half-windings are identical but with polarity reversed.

The winding here shown is derived by combining two 10-pole/14-pole PAM winding components in 24 slots at a spacing of nine slots.

In this winding, the 'error' between the e.m.f.'s induced in the two parallel paths, for 10 poles, is 5%. The error is one of magnitude only. In this case, the e.m.f.'s induced in the two parallel branches are co-phasal. The error is defined as the difference between the induced e.m.f.'s expressed as a percentage of their mean value. The error of 5% in this case is small, and would be quite acceptable in a small machine. Any reduction of error which is possible, however, is desirable in any size of machine and is essential in very large machines.

The side-by-side method of paralleling described herein requires that the second half of the winding described above be shifted by approximately an even number of poles, with respect to one of the pole-numbers, and an odd number of poles with respect to the other.

In the particular case of 10-poles/14-poles in 48 slots, a spacing of two poles on the scale of 10 poles is 9.6 slots, and a spacing of three poles on the scale of 14 poles is 10.3 slots. The closest approximation to both, in practice, is 10 slots, therefore.

Below the second half of the winding described above, corresponding to slots 25 to 48, the same half winding is reproduced, beneath the slot numbers 25' to 48', displaced by 10 slots.

Thus, in the displaced half winding, the coils corresponding formerly to slots 25 to 38, now slots 25' to 38', are transposed to slots 35 to 48. The coils corresponding formerly to slots 39 to 48, shown under slots 39' to 48', are transposed to slots 25 to 35, where these coils are reproduced in FIG. 1, the transposition being shown by the arrow I.

The ideal spacing, in terms of the number of slots, is exactly the same, both for the method of paralleling previously referred to and for the side-by-side method of the present invention. In the former method, however, a spacing corresponding to an odd number of slots, only, is possible in practice. This is because the two winding components are interleaved in alternate slots.

In the 48-slot 10-pole/14-pole winding, for example, the desired spacing of 10 slots cannot be applied by the interleaving method. No such restriction applies to the side-by-side method.

In the most general case, e.m.f.'s which are induced in the two sets of coils of each half-winding may be unequal both in magnitude and in phase.

In FIG. 2, there is shown at (a) the e.m.f., designated I (U), which is induced in the unreversed set of coils of the first half-winding. This differs from the e.m.f. designated I (R), induced in the coils which are reversed, on modulation.

Ideally, the displacement of the second half of the winding should, in effect, be zero electrical radians relatively to the pole-number for which the parallel paths are needed. In addition, coils which were originally unreversed in the second half of the winding must be reversed, on modulation, and vice-versa. If these two conditions are satisfied, the e.m.f.'s induced in the second half-winding are as shown in FIG. 2 at (b). The resultant e.m.f.'s induced in the two parallel branches then become exactly equal in both magnitude and phase, as shown in FIG. 2 at (c).

It is not always possible, in practice, to apply the ideal spacing. The nearest approximation, however, is normally sufficient.

In the particular case of the 48-slot 10-pole/14-pole winding, shown in FIG. 1, a spacing of 10 slots corresponds to 375° (or 15°) for 10 poles, and to 525° (or 165°) for 14 poles. When shifted 10 slots, therefore, the second half-winding must have the same signs for 10 poles, but needs to be reversed for 14 poles. Hence, coils which were originally unreversed, on modulation, must be reversed, and vice-versa. This interchange is necessary for application of the principles of side-by-side paralleling. In displacing the second half-winding sideways to the right, as shown in FIG. 1, the 10 slots initially left vacant are filled by the coil-sides which overlap with the first half of the winding, as described. Since these coils have to be moved $\pi$ mechanical radians, which is equivalent to $\pi$ electrical radians both for 10 poles and 14 poles, their signs must be reversed. The resultant winding consists of the original first half of the existing winding and the new second half. Clearly, the two halves of the final winding are no longer identical.

The spacing of 10 slots differs from the ideal spacing by 15° with respect to 10 poles. it can be shown that this reduces the error between the e.m.f.'s induced in the parallel paths from 5% in the existing winding, to only 0.7% in the final winding.

The displacement of the second half-winding is 165° with respect to 14 poles. When connected in the reverse sense, on modulation, this, in effect, becomes 15°. Thus, in this particular case, the winding halves are equally displaced, before and after modulation. Each of the layer factors is slightly reduced in the ratio of cos 7.5°:1 (=0.966:1). In the final winding, the layer factors thus are 0.931 for 10 poles, and 0.789 for 14 poles.

The example of obtaining parallel circuits of very nearly exact equality, here described, supposed that a P.A.M. winding of the desired pole-numbers, and using even-cycle modulation, already existed. It further supposed that the layouts of the two halves were identical, and that approximately equal parallel paths had already been formed. There was, however, some inequality of magnitude between the two parallel paths; and, in general, this method can be used greatly to reduce such inequalities, either of magnitude or of phase.

The method is, however, even more useful than this, as it can be used to form the parallel paths originally. If it is desired, for example, to design a six-pole/10-pole winding in 108 slots, the design can be commenced, regardless of any requirement of parallel paths, using repeated symmetrization methods starting with a four-slot component. The winding which results from this design procedure has all the required properties, except the possibility of using six-terminal parallel/series switching.

The design of the winding is then completed by shifting the second half of the winding by 18 slots and reversing the modualting wave for this second half of the winding, in the way described above. The interval of 18 slots is equivalent to one pole-pitch for six poles and is equivalent to 1.67 pole-pitches for 10 poles. Parallel paths for six poles are thus formed, without having to double the slot-number, and without having to constrain the design, at an earlier stage, by the formation of parallel paths.

One of the half-windings is always shifted relatively to the other, with appropriate spacing and changes in sign. Unlike the method of interleaving referred to earlier, no increase in slot-number is involved. Furthermore, a greater degree of freedom is possible in selecting the required spacing between the winding sections.

The method here described results in a winding distribution which has no repeatable sections. Because of this, the winding can be further treated by a method of transposing coils across a winding diameter, to find a resultant layout of least harmonic content, without affecting the basic properties of the winding with respect to the main pole-numbers.

We claim:

1. A three-phase, alternating-current, speedchanging electric machine, comprising a motor or generator, in which pole-changing is effected by the method of pole-amplitude modulation, having a composite three-phase stator winding comprising two component windings, said two component windings having their corresponding phase-windings arranged both in the same phase of the resultant said composite winding, each said component winding comprising two identical halves of a pole-amplitude modulation winding providing the operating pole-numbers required for the said speed-changing machine by even-cycle pole-amplitude modulation, the two said half-windings being spaced apart from each other around the composite stator winding periphery by a spacing other than a single-slot spacing and being connected together for one said pole-number to provide equal parallel circuits, in which pole-changing is effected by alternate series/parallel connection of phase-winding parts of the said composite winding by six-terminal, terminal means.

2. A speed-changing electric machine as claimed in claim 1, in which the said composite three-phase stator winding is wound on a slotted stator frame and the said two half-windings are spaced apart from each other around the stator frame periphery in such manner that corresponding parts of the two half-windings are spaced apart by a uniform number of slots, said number of slots corresponding to substantially an even number of poles for one said operating pole-number and substantially an odd number of poles for the other said operating pole number.

3. A speed-changing electric machine as claimed in claim 1, including switch means for connecting the two said half-windings in the said parallel connection for the said one pole-number and for connecting the two said half-windings serially together for the other pole-number.

4. A speed-changing electric machine as claimed in claim 2, having operating pole-numbers of 10-poles and 14-poles, in which the said composite winding is wound on a 48-slot stator and in which the two said half-windings are spaced apart by 10 slots.

5. A speed-changing electric machine as claimed in claim 4, in which a number of coils of one said half-winding corresponding to the slot-spacing, that is 10 coils, are transposed on the said stator frame by the number of slots corresponding to the remaining number of coils of the said half-winding, that is 14 slots and the current-carrying sense of the coils is reversed.

* * * * *